US005128688A

United States Patent [19]

West

[11] Patent Number: 5,128,688

[45] Date of Patent: Jul. 7, 1992

[54] MAST TRANSLATION AND ROTATION DRIVE SYSTEM UTILIZING A BALL DRIVE SCREW AND NUT ASSEMBLY

[75] Inventor: William E. West, Hartford, Conn.

[73] Assignee: Sperry Marine, Inc., Charlottesville, Va.

[21] Appl. No.: 618,782

[22] Filed: Nov. 27, 1990

[51] Int. Cl.[5] .......................... H01Q 3/04; H01Q 1/34; F16H 29/02; B63G 8/38

[52] U.S. Cl. .................................. 343/766; 74/89.15; 114/340; 343/709

[58] Field of Search ............... 74/89.15; 343/709, 878, 343/880, 882, 883, 890, 757, 758, 761-766; 114/339, 340

[56] References Cited

U.S. PATENT DOCUMENTS

| | | | |
|---|---|---|---|
| 3,453,630 | 7/1969 | Thompson | 343/757 |
| 3,495,261 | 2/1970 | Lastinger et al. | 343/883 |
| 4,266,437 | 5/1981 | Obergfell | 74/89.15 |
| 4,352,300 | 10/1982 | Esch | 74/89.15 |
| 4,867,000 | 9/1989 | Lentz | 74/89.15 |
| 4,920,814 | 5/1990 | Espy | 74/89.15 |

FOREIGN PATENT DOCUMENTS

| | | | |
|---|---|---|---|
| 2202607 | 9/1988 | United Kingdom | 74/89.15 |

OTHER PUBLICATIONS

J. E. Passafiume, Linear/Rotary Actuator, IBM Technical Disclosure Bulletin, vol. 24, No. 12, May, 1982, pp. 6518-6519.

*Primary Examiner*—Rolf Hille
*Assistant Examiner*—Peter Toby Brown
*Attorney, Agent, or Firm*—Seymour Levine; Albert B. Cooper

[57] ABSTRACT

A submarine radar antenna mast extension, retraction and rotation mechanism comprises a ball drive screw attached to the mast with a ball drive nut threaded to the screw. A rotary tube surrounds the mast with the mast keyed for translation within the rotary tube and prevented from rotation with respect to the rotary tube. An outer tube surrounds the rotary tube and effects a static hull penetration seal with respect to the submarine. The rotary tube rotates within the outer tube, but is prevented from translation with respect thereto. A brake/indexing assembly geared to the rotary tube selectively releases the rotary tube for rotation or locks the rotary tube to an indexed position for extension and retraction. A single bi-directional hydraulic drive motor geared to the ball drive nut effects mast extension and retraction by applying the brake to prevent rotary tube rotation. The drive motor effects mast rotation by releasing the brake. A primary seal assembly at the top of the outer tube contains a removable seal cartridge containing separate seals for sealing against translational and rotational motions, respectively.

19 Claims, 8 Drawing Sheets

MAST TRANSLATION AND ROTATION DRIVE SYSTEM UTILIZING A BALL DRIVE SCREW AND NUT ASSEMBLY

The invention was made with United States Government support and the United States Government has certain rights therein.

BACKGROUND OF THE INVENTION

1. Field of the Invention

The invention relates to mast drive systems that extend, retract and rotate the mast particularly with respect to a submarine mast drive system. The system has particular application to a radar antenna mast.

2. Description of the Prior Art

The present day submarine radar system utilizes a radar antenna mounted near the top of an extendible and retractable mast. When utilizing the radar system, the mast is extended so that the antenna projects beyond the metal skin of the submarine and is then rotated to provide antenna scanning. Thereafter, the mast and antenna are retracted to within the outer periphery of the submarine for submerged running. Present day mast drive arrangements require utilization of two separate complex drive systems; viz, one system for mast extension and retraction and one system for mast rotation. For example, hydraulic cylinders or cable systems are utilized for extension and retraction and electrical gear drive systems are utilized for rotation. Such separate drive systems tend to be undesirably expensive and bulky and hence occupy large amounts of submarine space. Additionally, the requirements of compatibility between the rotational and translational systems tend to further exacerbate the system complexity and cost. Such systems also tend to require frequent maintenance during the expected life to overhaul cycles thereof.

In addition to the above disadvantages, prior art mast drive systems tend to generate undesirable noise levels such as hydraulic cylinder noise and noise generated from multiple complex gear systems. Prior art systems also often require complex and critical alignment procedures during mast installation, requiring external guides or alignment mechanisms attached to the submarine. Furthermore, in prior mast drive system designs, the extension mechanism bears the load of large portions of the systems with a concomitant reduction in reliability. Thus in prior designs, antenna drive unit equipment often loads the lower mast extension, resulting in an undesirable reduction in mast resonant frequency.

Prior systems often require dynamic seals against translation and rotation at the mast hull penetration fitting, increasing the maintenance and reliability problems associated therewith. Such seals are very difficult to access and replace while at sea. Additionally, such seals tend to utilize design concepts that are compromises between the rotational and translational motions that the seal should withstand. Generally, repairs of such seals are effected in dry dock where the mast mechanism can be removed therefrom.

Typically, the submarine sail mount stations are utilized for providing support for the mast system. In prior designs these supports are required to accommodate translation and rotation of the mast with the concomitant problems associated therewith. In such prior systems critical components are often included at these stations and hence are exposed to sea water.

SUMMARY OF THE INVENTION

The above disadvantages of the prior art are overcome by a mast drive system comprising a ball bearing drive screw attached to the mast and an associated ball bearing drive nut rotationally driven by a single drive motor. An actuatable brake prevents the drive screw from rotating while the drive motor rotates the drive nut so as to cause the mast to be extended. When the mast is fully extended, the brake is released permitting the rotating drive nut to impart rotation to the drive screw. The mast is retracted by actuating the brake and causing the drive motor to rotate in the direction opposite to that for extension.

In the preferred embodiment, a three-tube telescoping design is utilized with the mast as the central tube. The mast is keyed for translation within a rotary tube which in turn is mounted for rotation within an outer tube. The rotary tube is geared to an auxiliary shaft to which the brake is coupled. An auxiliary gear coupled through a clutch to the auxiliary shaft is geared to rotate with the drive nut. During extension and retraction of the mast, the brake locks the auxiliary shaft so as to prevent the rotary tube from rotating and the clutch disengages the auxiliary gear from the auxiliary shaft. During mast rotation the brake releases the auxiliary shaft permitting the rotary tube to rotate and the clutch couples the auxiliary gear to the auxiliary shaft. By this mechanism the drive screw is positively coupled to the drive nut for rotation therewith.

DESCRIPTION OF THE PREFERRED EMBODIMENT

Figure 1:
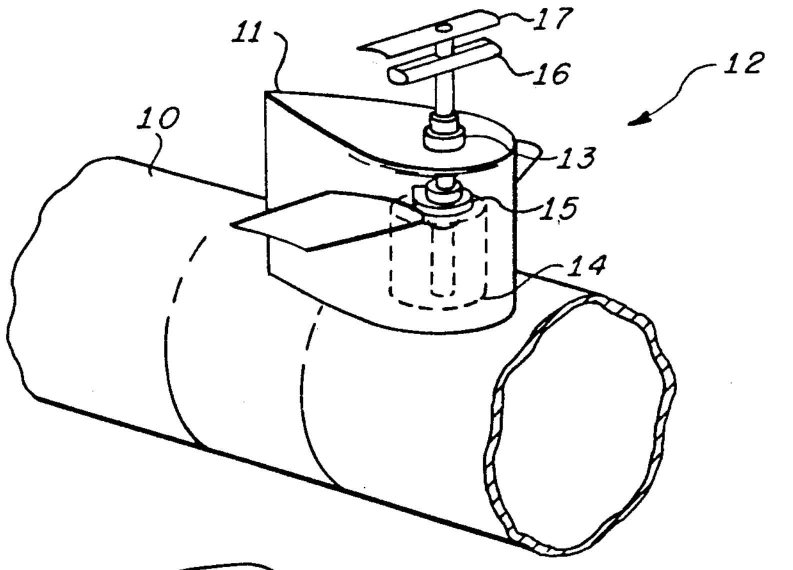
FIG. 1 is a three dimensional partial view of a submarine hull and sail illustrating the mounted radar antenna mast system.

Referring to FIG. 1, a portion of a submarine hull 10 and a submarine sail 11 is illustrated. A radar antenna mast 12 is shown extended from the sail 11 with an upper support 13 secured to the ship's foundation and with the radar antenna mast system extending into the bridge access trunk 14. A hull fitting for the radar mast system 12 into the bridge access trunk 14 is illustrated at 15. The radar mast system 12 includes a radar antenna 16 and an ice cap 17.

Figure 2A:
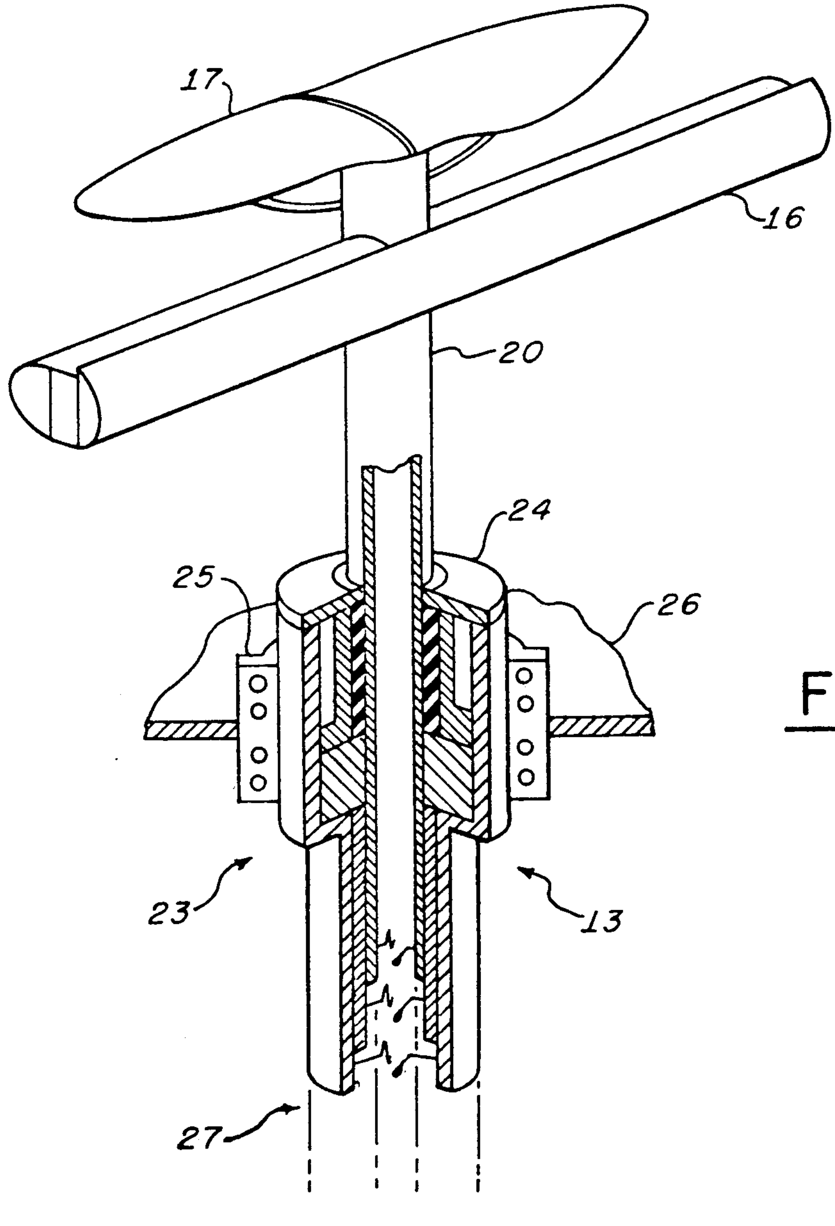
FIGS. 2A and 2B represent a three dimensional, partially cutaway view of the radar antenna mast system of the present invention mounted in the submarine sail of FIG. 1.
Figure 2B:
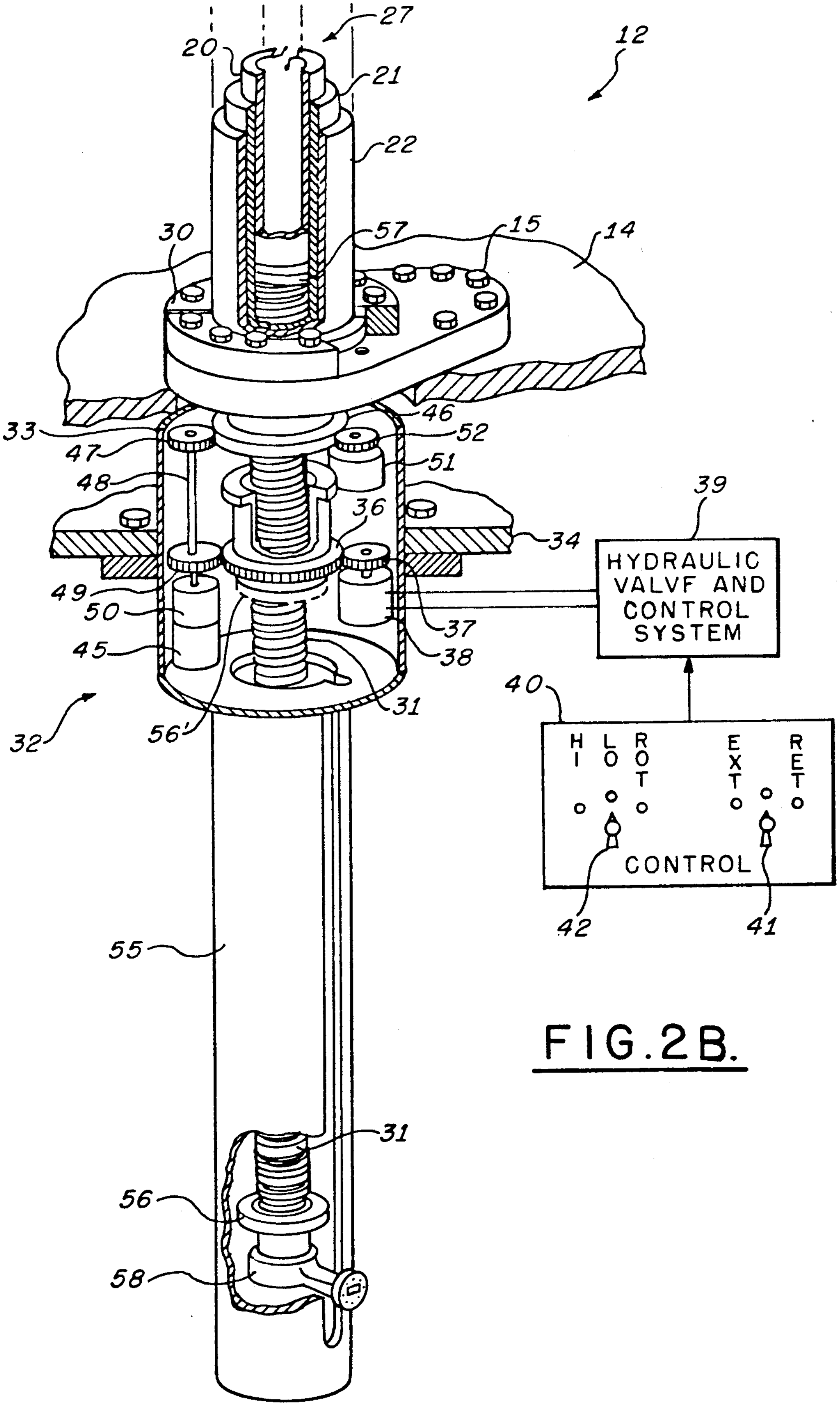

Referring to FIGS. 2A and 2B, details of the mast system 12 are illustrated. The antenna 16 and ice cap 17 are attached to a mast 20 keyed to translate in an axial direction within a rotary tube 21. The keys and keyways (illustrated in subsequent figures) prevent the mast 20 from rotating relative to the rotary tube 21. The rotary tube 21 is journaled for rotation with respect to an outer tube or housing 22. The upper end of the rotary tube 21 is journaled in an upper bearing assembly 23 which is sealed against sea water by a primary seal assembly 24. A split collar 25 secures the primary seal assembly 24 and upper bearing assembly 23 to the ship's foundation 26 forming the upper support 13 to the sail mount station as discussed with respect to FIG. 1. A split collar intermediate support (not shown) is provided as indicated by reference numeral 27. The rotary tube 21 is mounted within the outer tube 22 such that translation therebetween is prevented.

The bottom of the outer housing 22 is attached to the hull fitting 15 utilizing a split collar bolted clamp ring 30 which forms a static seal fit to &he existing submarine bolting pattern. The outer tube 22 eliminates dynamic seals (rotational and translational) at the hull fitting 15. The outer housing 22 in conjunction with the hull fitting 15 is considered a semi-permanent submarine installation. The outer housing 22 provides a well into which all mast equipment is installed. The rotary drive and extension functions do not rely on the outer tube 22 for essential operation. The outer tube 22 provides, at the top thereof, a sealed housing for the upper bearing assembly 23 and primary seal assembly 24, and with the hull fitting 15 and split collar 30 provides the subsafe boundary. The outer tube 22 provides, along the length thereof, simple mounting interfaces to the submarine support structure increasing the stiffness of the mast unit 12, thereby increasing the resonant frequency thereof. The hull fitting 15 is bolted to the bridge access trunk 14.

A ball drive screw 31 is attached to the bottom of the mast 20 and extends through an antenna drive unit 32. The antenna drive unit 32 includes a housing 33 fastened to a mounting station 34 within the bridge access trunk 14. It is appreciated therefore, that the antenna drive unit 32 is contained within the subsafe boundary. The ball drive screw 31 is coupled through a ball drive nut 35 having a housing mounted on roller bearings (illustrated in subsequent figures). The ball drive nut 35 is coupled through a single gear pass comprising a ball drive nut gear 36 and a motor gear 37 to a bi-directional, multi-speed hydraulic drive motor 38. The hydraulic motor 38 is driven through a conventional hydraulic valve and control system 39 and control panel 40. The control panel 40 includes an extension/retraction control 41 and a high/low rotation speed control 42. When the extension control 41 is set to EXTEND, the hydraulic motor 38 is driven in a direction to cause the ball drive nut 35 to rotate in a clockwise direction (as illustrated in the figure). When the control 41 is set to RETRACT, the hydraulic motor 38 is driven in a direction opposite to that for mast extension.

A brake/indexing assembly 45 is included in the antenna drive unit 32. The bottom of the rotary tube 21 extends to the housing 33 and is coupled to the brake/indexer 45 through a rotary tube gear 46, a brake gear 47 and an auxiliary shaft 48 that extends into the brake/indexer 45. An auxiliary over ride gear 49 is mounted for rotation about the shaft 48 and meshes with the ball drive nut gear 36. A clutch 50, coupled between the gear 49 and the shaft 48, controllably couples and decouples the gear 49 to the shaft 48 for locked rotation therewith or for free rotation thereabout.

The brake/indexing assembly 45 controllably locks and unlocks the shaft 48 with respect to rotation thereof. Thus, the brake/indexing assembly 45 controllably prevents and permits rotation of the rotary tube 21 and hence rotation of the mast 20 keyed thereto. The brake/indexing assembly 45 also includes a conventional mechanization for locking the rotary tube 21 and mast 20 at a predetermined indexed angular position, which mechanism may comprise an asymmetrical one tooth clutch. This is so that during mast retraction the antenna 16 and ice cap 17 are properly oriented for retraction into the sail 11.

During extension and retraction, the brake/indexer 45 prevents the rotary tube 21 from rotating and the clutch 50 releases the gear 49 to rotate relative to the auxiliary shaft 48. During the radar antenna rotation mode, the brake/indexer 45 releases the rotary tube 21 for rotation and the clutch 50 locks the auxiliary gear 49 to rotate with the auxiliary shaft 48. A synchro 51 is coupled to the rotary tube gear 46 through a synchro gear 52. The synchro 51 provides a signal in accordance with the azimuthal angular position of the rotary tube 21 and hence of the mast 20 and antenna 16 in a conventional manner.

Thus, it is appreciated that the antenna drive unit 32 provides a rotational and translational drive system that is concentric with the mast 20 and uses a single drive motor. Torque is directly coupled to the mast unit through the stationary antenna drive housing 33 which is mounted directly on the station 34 in the bridge access trunk 14. The motor gear 37, ball drive nut gear 36, brake/indexer 45, clutch 50, auxiliary gear 49, auxiliary shaft 48, brake gear 47, rotary tube gear 46, ball drive screw 31 and ball drive nut 35 may be considered as a controllable planetary-type gear system transmission through which the hydraulic motor 38 selectively imparts multiple speed, bi-directional, translational or rotational motion to the mast 20. The transmission 32 also provides rotary support for the lower end of the rotary tube 21, as illustrated in subsequent figures.

A ball screw cover 55 extends from the housing 33 to house the ball drive screw 31. A mast extension/rotation transition pad 56 is disposed at the bottom of the ball drive screw 31 to limit the translational travel during mast extension. The transition pad 56 (in dashed line) is shown in the extended position by reference numeral 56'. An upper stop 57 is disposed at the top of the ball drive screw 31 to limit the translational travel thereof during mast retraction. A microwave rotary joint 58 at the lower end of the ball drive screw 31 couples with the radar antenna 16 via a wave guide (illustrated in subsequent figures) within the ball drive screw 31 and mast 20 to provide, in a conventional manner, radar microwave transmission components of the system.

When a mast extension cycle is commanded, the brake 45 clamps the shaft 48 preventing rotation of the mast 20 and ball drive screw 31 via the keyed rotary tube 21, rotary tube gear 56 and brake gear 47. The clutch 50 releases the auxiliary gear 49 so that it can freely rotate on the shaft 48. The switch 41 is positioned to EXTEND and hydraulic fluid is ported through the appropriate valving in the system 39 causing the motor 38 to drive in the raise direction. With the mast tube 20 and drive screw 31 prevented from rotation, the driven ball drive nut 35 exerts a lifting force on the screw shaft 31 and the mast 20 extends. As the mast 20 approaches the fully extended position, a limit switch (not shown) on the mast is activated and hydraulic fluid is ported to a high/low rotation speed control valve in the system 39 causing the motor 38 to rotate at a low speed. This sequence permits the mast 20 to be raised at a fast rate for most of the required vertical translation and then decelerated to a fully raised position.

When mast extension is completed, the transition pad 56, which comprises a mechanical stop on the bottom of the screw shaft 31, effects contact with the bottom of the housing of the ball drive nut 35 preventing further extension. When this occurs, the brake 45 is released and mast rotation begins. The ball drive nut 35 is now directly coupled to the screw 31 in a direct rotational drive mode, which generates low rotational noise.

Simultaneously with releasing the brake 45, the clutch 50 is energized locking the auxiliary gear 49 to the shaft 48. Thus, in the direct rotational drive mode, the auxiliary shaft 48 is redundently geared to the rotary tube 21 through the rotary tube gear 46 and to the ball drive nut 35 through the ball drive nut gear 36 to provide additional rotational control functions, such as "back drive" prevention and manual operation, to be described. In the direct rotational drive mode, the motor 38 directly drives the ball drive nut 35 as well as the ball drive screw 31 in the same direction and at the same rotational velocity. Activation of the clutch 50 effectively locks the ball drive nut 35 to the ball drive screw 31 to effect the direct rotational drive mode.

It is appreciated that the system could function without the clutch 50 and auxiliary gear 49 for power transmission. Clutch 50 and gear 49 are, however, required for "back drive" control. When the system effects transition between mast extension and mast rotation, the motor 38 continues to drive in the same direction. With the transition pad 56 abutting the housing of the ball drive nut 35, the drive nut 35 is rotating in a direction to maintain the mast 20 extended. If the mast 20 should, however, begin rotating faster than the ball drive nut 35; e.g., if the ball nut should stop rotating, the mast 20 would have a tendency to screw itself back down into the submarine (back drive). Back drive might occur because of the downwardly bearing weight of the screw, mast, antenna and ice cap. The clutch 50 and gear 49 provide a positive lock that prevents this from occurring. The over ride gear 49 may also be utilized for manual extension and retraction via gears, rods and a hand crank (not shown). Preferably, however, a hand crank (not shown) coupled to the motor shaft is utilized for this purpose.

When the antenna 16 is fully raised, the high/low rotation speed switch 42 is activated permitting antenna rotation speed to be selected from a radar control panel (not shown). Thus, the high and low speed functionality of the hydraulic drive motor 38 is utilized both in the high speed antenna raise and decelerate mode and in the high/low rotation speed control of the antenna 16.

To retract the mast 20, a rotation stop cycle is commanded initiating a sequence of operations. The angular position of the antenna 16 continues to be driven in the rotational mode by the ball nut and screw drive mechanism until the mast 20 is mechanically indexed to the correct position for retraction. The brake/indexing assembly 45 performs this function in a conventional manner. In this position, a switch (not shown) on the mast energizes the mast retraction or lower mode. The brake 45 is applied to lock the shaft 48 and the clutch 50 is deactuated to release the gear 49. Hydraulic fluid is now ported in a reverse direction through valving in the system 39 to the drive motor 38, thereby reversing the direction of rotation thereof. With the reverse (counterclockwise) rotation of the ball drive nut 35, retraction of the mast 20 begins and continues until the cycle is complete when the upper mechanical stop 57 on the screw 31 effects contact with the top of the housing of the ball drive nut 35. Upon completion of retraction, a limit switch (not shown) de-energizes the retraction control in the system 39 and the drive motor 38 is stopped. The mast 20 is thus hydraulically locked in place in the retracted position.

Figure 3:
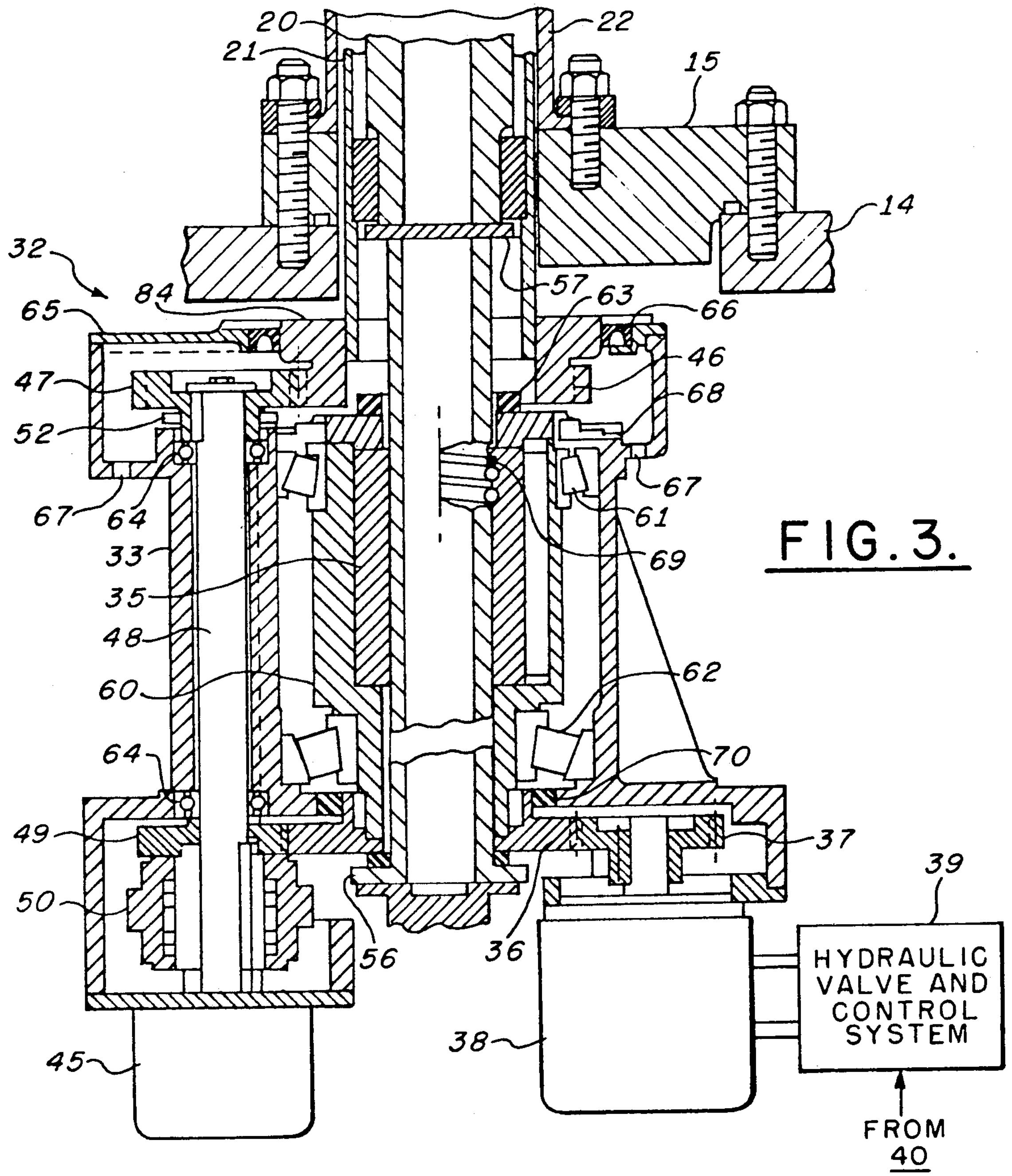
FIG. 3 is an elevation view in cross-section illustrating details of the antenna drive unit of the present invention.

Referring to FIG. 3, in which like reference numerals indicate like components with respect to FIGS. 2A and 2B, further details of the antenna drive unit 32 are illustrated. The ball drive screw 31 and ball drive nut 35 are schematically illustrated. The ball drive nut 35 includes a housing 60 rotatably supported within the transmission housing 33 by an upper taper bearing 61 and a lower taper bearing 62. The extension/rotation transition pad 56 is illustrated in the position where extension of the mast 20 is complete and rotation thereof begins. In the retraction mode, antenna retraction is limited by the upper stop 57 and an upper stop pad 63. The auxiliary shaft 48 is journaled for rotation in bearings 64. The antenna drive unit 32 is sealed at the top by a drive unit top cover 65 and an upper water seal 66. Water drainage is effected via water drain holes 67 and the upper taper bearing 61 is retained via an upper bearing retainer 68 with a leakage control trough. The ball nut configuration is sealed by a ball nut seal 69 and a lower grease seal 70 is included for grease retention. A second ball nut seal 69 (not shown) is included at the bottom of the ball nut assembly. Rotary support for the lower end of the rotary tube 21 is effected by the transmission 32 as schematically indicated at 84. Further details are provided in FIG. 8.

It is appreciated that the hydraulic system 39 comprises standard hydraulic control valves operating from the ship hydraulic supply which provide the power to the motor 38 for the high/low speed rotation and raise/-lower translation as well as the motor drive reversal required to lower the mast. The precision ball drive screw as the transmission mechanism permits utilization of a single drive motor to effect the control functions. For mast extension the motor turns in one direction and continues to turn in the same direction for mast rotation. The motor direction is reversed for mast retraction. The speed of the motor is controllable thereby providing multi-speed antenna rotation control. The multi-speed capability of the motor also permits the rapid extension and deceleration to full extension function described above.

Figure 4:
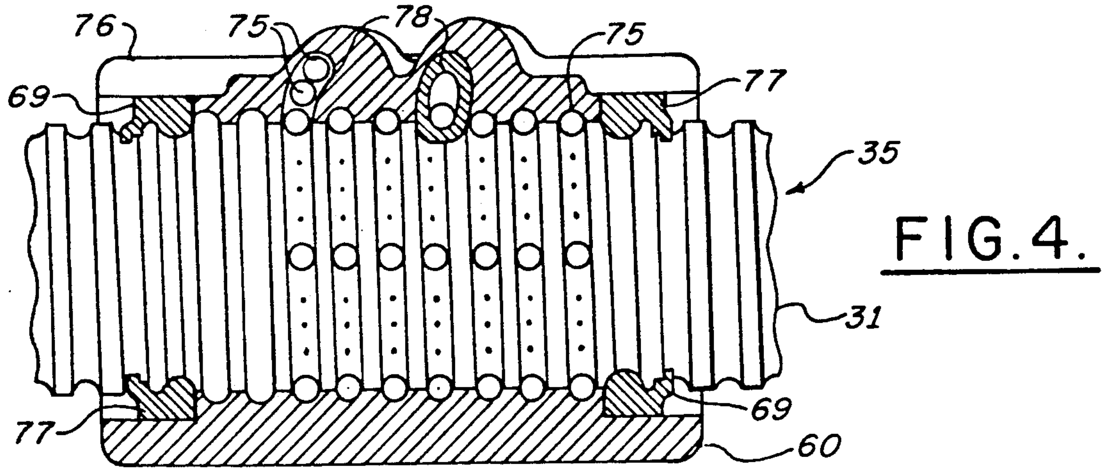
FIG. 4 is a cut-away view of the precision ball drive screw assembly of the antenna drive unit of FIG. 3.

Referring to FIG. 4, in which like reference numerals indicate like components with respect to FIGS. 2A and 2B and 3, details of the precision ball drive screw assembly are illustrated. The precision ball drive screw assembly comprised of the ball drive nut 35 and the ball drive screw 31 includes bearing balls 75 circulating in hardened steel races or tracks 76 formed by concave helical grooves in the screw and nut. Wipers 77 are conventionally included and the ball screw assembly is fitted with seals 69 at each end of the ball nut drive housing 60 which permanently retain grease lubricant and exclude foreign matter from the assembly.

As the screw 31 and nut 35 rotate relative to each other, the bearing balls 75 are diverted from one end and are carried by ball guide return or recirculating tubes 78 to the opposite end of the ball circuit. This recirculation permits unrestricted travel of the nut 35 in relation to the screw 31. In the preferred embodiment, five complete circuits of balls in contact between the nut 35 and the screw 31 share the operating and non-operating loads. All reactive loads between the screw 31 and the nut 35 are carried by the bearing balls 75 which provide the only load bearing physical contact between these members. The precision ball drive screw assembly is a commercial component part available from numerous sources.

It is appreciated that the precision ball drive screw assembly illustrated in FIG. 4 is designed in accordance with well established and well known technology. The ball screw is traditionally utilized in linear actuators in such applications as aircraft flap and slat drives and landing gear actuators. The ball drive screw has a tendency to rotate when utilized as a linear actuator and this rotation is inhibited in such applications. The present invention utilizes this rotational tendency to provide for the direct drive rotational mast motions described above.

The ball screw is a high efficiency force and motion transfer device which replaces the sliding friction of the conventional power screw with the rolling friction of bearing balls. It is appreciated that although the power screw could conceptionally be utilized in implementing the invention, the precision ball drive screw assembly provides the best mode embodiment. The ball drive screw mechanism exhibits uniform feed under varying load conditions and provides smooth and quiet operation. It is appreciated that the ball mechanism is not in relative motion when providing the rotational drive function. The screw 31 and nut 35 are locked together in this mode and therefore do not generate any noise whatsoever. This is unlike the multiple gear pass prior art mast rotation drive systems described above.

Figure 5:
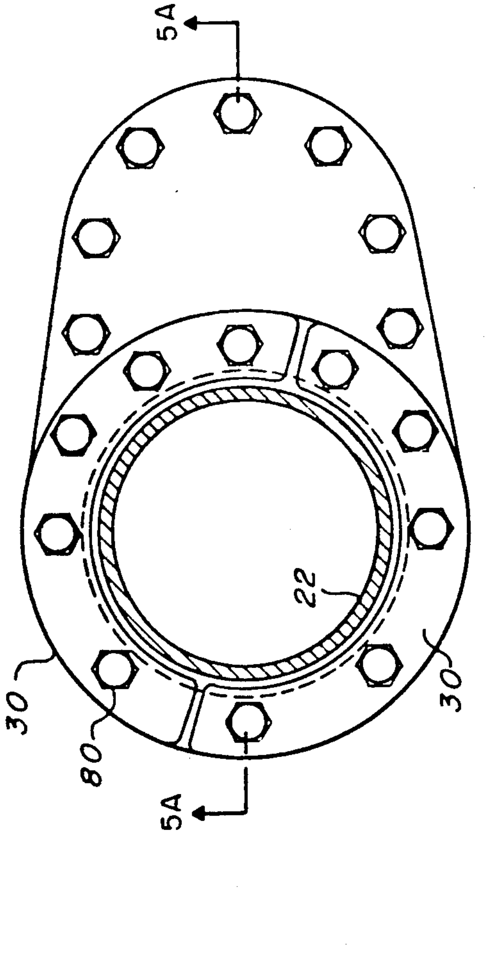
FIG. 5 is a plan view of the mast hull fitting interface utilized with the radar antenna mast system of FIG. 2.
Figure 5A:
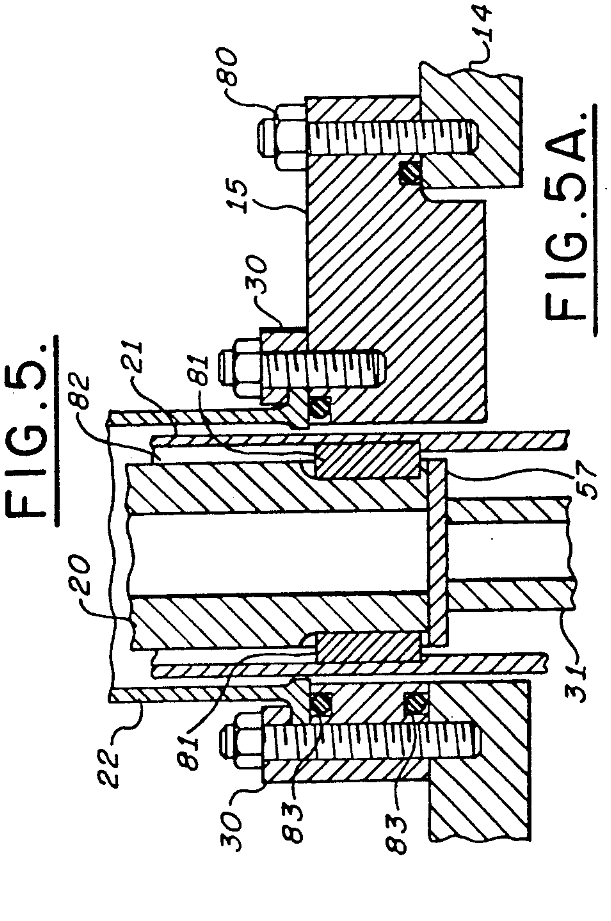
FIG. 5A is an elevation view of a cross-section of the mast hull fitting interface of FIG. 5.

Referring to FIGS. 5 and 5A, in which like reference numerals indicate like components with respect to FIGS. 2A—2B, further details of the mast hull fitting interface 15 are illustrated. FIG. 5A is a section taken through the line A—A of FIG. 5. In FIG. 5, the mast 20 and rotary tube 21 are not illustrated for clarity. FIG. 5 illustrates the pre-existing hull bolt pattern. Additional bolt holes 80 are required for clamping the flange of the outer tube 22 by the split locking collar 30.

With reference to FIG. 5A, keys 81 on the mast 20 translate axially in keyways 82 in the rotary tube 21. As previously described, the keys and keyways 81, 82 permit translation of the mast 20 within the rotary tube 21 but prevent relative rotation therebetween. Included are "0" rings 83 for sealing purposes.

It is appreciated from the foregoing, that the present invention applies the precision ball drive screw to permit both the extension of the telescoping mast 20 and rotation thereof utilizing the single drive motor 38. The three-tube design, in combination with the single drive multi-function antenna drive unit, achieves the functions of extension, rotation, alignment and integrity of the subsafe boundary. The invention permits the submarine sail mount stations to be utilized only for static support. These stations do not contain critical components and hence no critical component is exposed to sea water. The present invention utilizes the existing shock qualified hull fitting design described and the pre-existing hull penetration. Thus, a simple interface is provided for the radar antenna and ice cap mount for all submarines.

The mast 20 is the innermost tube that implements raising, lowering and supporting the antenna 16 and ice cap 17. The bearings and seals that support the mast 20 utilize designs of modern technology optimized for translational motion. As described above, all antenna drive unit equipment is attached to the bridge access trunk structure 14 and therefore does not load the lower mast extension. This permits the mast assembly to be optimized for maximum resonant frequency with minimum mass loading. The invention also reduces the extension power requirements for the antenna drive unit 12 and effects the most efficient use of available bridge access trunk space for maximum extension.

The rotary tube 21 implements all of the rotary control and indexing functions for the mast unit. The rotary tube 21 supports the bottom of the mast 20 in the extended position and provides the internal alignment function. Since the rotary tube 21 does not extend, these functions are effected without loading the extension system. The rotary tube 21 is supported by bearings and seals that utilize designs of modern technology optimized for rotary motion.

The precision ball drive screw and nut is a high efficiency mechanism that performs the function of extension and retraction as a linear actuator and the rotary function as a direct coupled torque transmitting device while being driven by a single motor. All of the functions for mast control, alignment and indexing are achieved without the requirement for external guides or alignment mechanisms attached to the submarine. The three-tube mast system augments the application of the ball drive embodiment described above. The mast tube 20 is free to translate within the rotary tube 21 but is not permitted to rotate with respect thereto because of the keyway coupling between the tubes 20 and 21. The rotary tube 21 extends into the antenna drive unit 32 and is geared through the auxiliary shaft 48 to the brake 45. When the brake 45 is on, rotation of both the rotary tube 21 and the mast 20 is prevented. As described above, this provides the functionality that supports mast extension and retraction. When the brake 45 is off, the mast 20 is in the rotational drive mode with the auxiliary shaft 48 redundently geared to the rotary tube 21 and the ball drive nut 35, as described above.

The integration of the three-tube mast configuration and the ball drive screw system provides an efficient and effective single concentric drive, radar mast system. The hydraulic drive motor 38 exhibits the characteristics particularly desirable for the preferred embodiment of speed, torque, quietness of operation, and reversing capability. The single motor 38 geared directly within the antenna drive unit 32 provides the functionality described above with a minimum of control system complexity. The present invention smoothly and quietly provides the required antenna mast unit drive functions of extension, dual rate antenna rotation, indexing and retraction.

Figure 6:
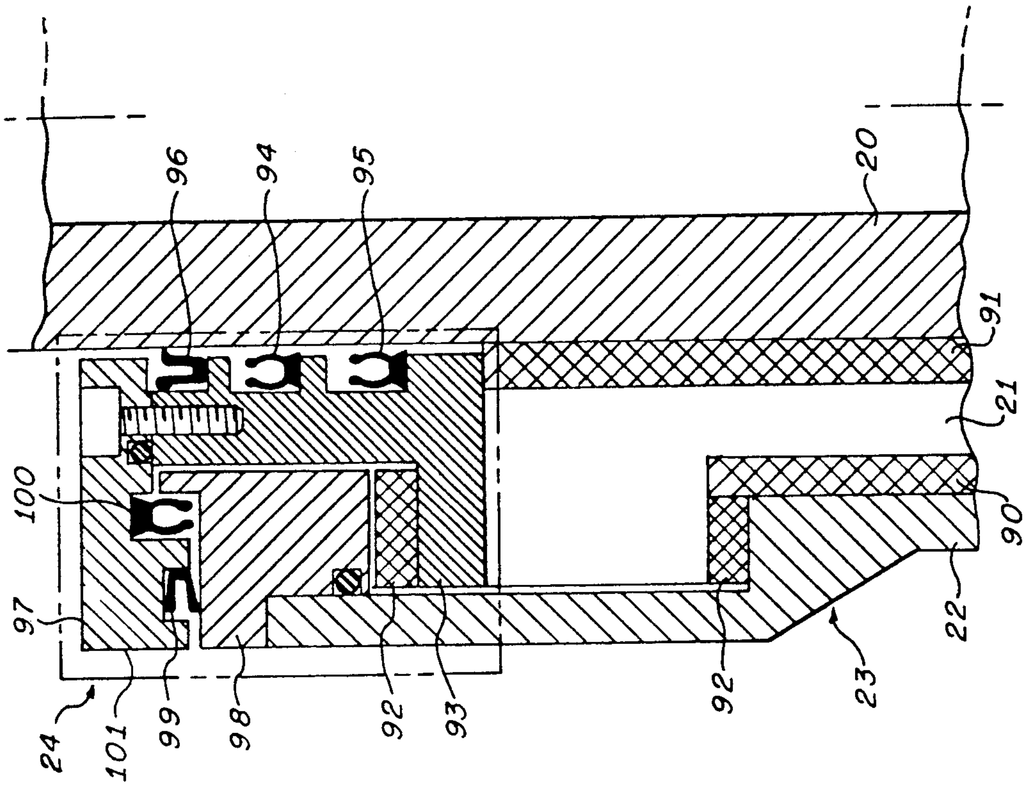
FIG. 6 is a partial elevation view in cross-section schematically illustrating the primary seal and upper bearing cartridge assembly of FIG. 2.

Referring to FIG. 6, in which like reference numerals indicate like components with respect to FIGS. 2A—B, details of the upper bearing assembly 23 and primary seal assembly 24 are illustrated. An upper radial rotary bearing 90 rotationally supports the rotary tube 21 with respect to the outer housing 22. An upper linear translational bearing 91 translationally supports the mast 20 with respect to the rotary tube 21. Thrust pad bearings 92, which rotate with the rotary tube 21, maintain the rotary tube 21 in position within the outer housing 22. The primary seal assembly 24 is disposed above the thrust bearing 92 and rotates with the rotary tube 21. A member 93, which rotates with the rotary tube 21, supports primary linear seal 94 and secondary linear seal 95. The member 93 also supports a scraper ring 96. A member 97, which rotates with the rotary tube 21, in combination with a member 98 (part of the outer housing 22), support a primary rotational seal 99 and a secondary rotational seal 100. The translational seals 94 and 95 seal against the translation of the mast 20 when in the extend/retract modes and rotate therewith when in the rotary mode. The rotational seals 99 and 100 seal, with respect to the stationary member 98, against rotation of the member 97 which rotates with the rotary tube 21 when in the rotational mode. The elements 93-100 together with the upper thrust bearing 92 form a removable seal cartridge 101. The cartridge 101 and seals contained therein are components of the subsafe pressure hull integrity boundary.

It is appreciated that in modern seal technology, seal designs are available that are optimized to seal against translational motions and seal designs are available that are optimized to seal against rotational motion. Thus, the seals 94, 95, 99 and 100 are optimized with respect to the type of motion against which they are designed to seal. The seals 94 and 95 experience only translational motion and the seals 99 and 100 experience only rotational motion. Such seals may, for example, be implemented by conventional rod seals or face seals. The scraper ring 96 is also of conventional design.

Figure 6A:
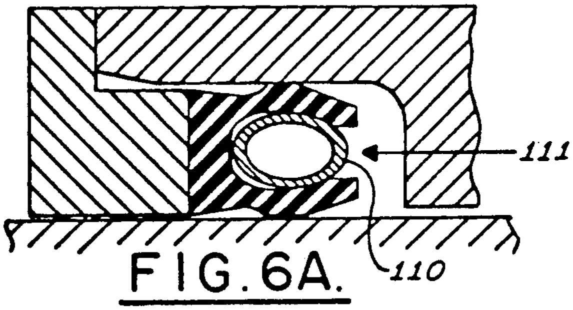
FIGS. 6A, B and C are cross-sectional views illustrating typical seals and scrapers utilized in the cartridge assembly of FIGS. 6 and 6D.
Figure 6B:
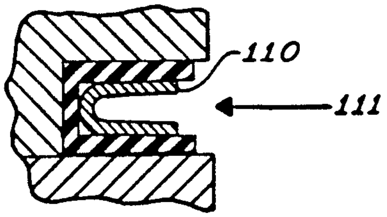
FIG. 6D is an elevation view in cross-section illustrating details of a preferred primary seal and upper bearing cartridge assembly of FIG. 2.
Figure 6C:
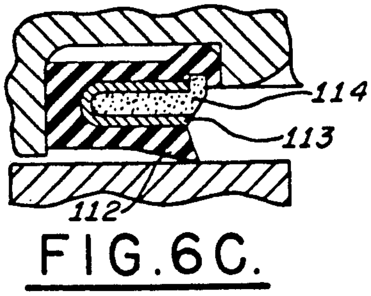

Referring to FIGS. 6A-C, a typical rod seal, a typical face seal and a typical exclusion device scraper are illustrated, respectively. The "U" seal configurations of FIGS. 6A and 6B comprise a premium PTFE (Teflon) alloy cover over a corrosion resistant support spring 110. The seals are actuated by seawater pressure as indicated by arrows 111. Typically, the rod seal of FIG. 6A is utilized to implement linear seals and the face seal of FIG. 6B is utilized to implement rotary seals. It is appreciated, however, that the rod seal configuration can also be utilized to withstand rotation.

The scraper of FIG. 6C is a linear exclusion device that comprises a scraper jacket 112, a spring 113 and a silicon fill 114. The jacket 112 may be comprised of high abrasion resistant Teflon and the silicon fill 114 is utilized to prevent contamination entrapment. The scraper of FIG. 6C is therefore a single-acting metallic spring activated jacket of high abrasion resistant material.

The three-tube mast design creates a controlled environment for the bearings and seals and separates the rotary and translational motion sealing functions thereof. The primary seals 24 with the functions separated, as described above, are contained in a removable cartridge located at the top of the mast housing directly above the upper bearings. This arrangement greatly facilitates repairability and maintainability.

Figure 6D:
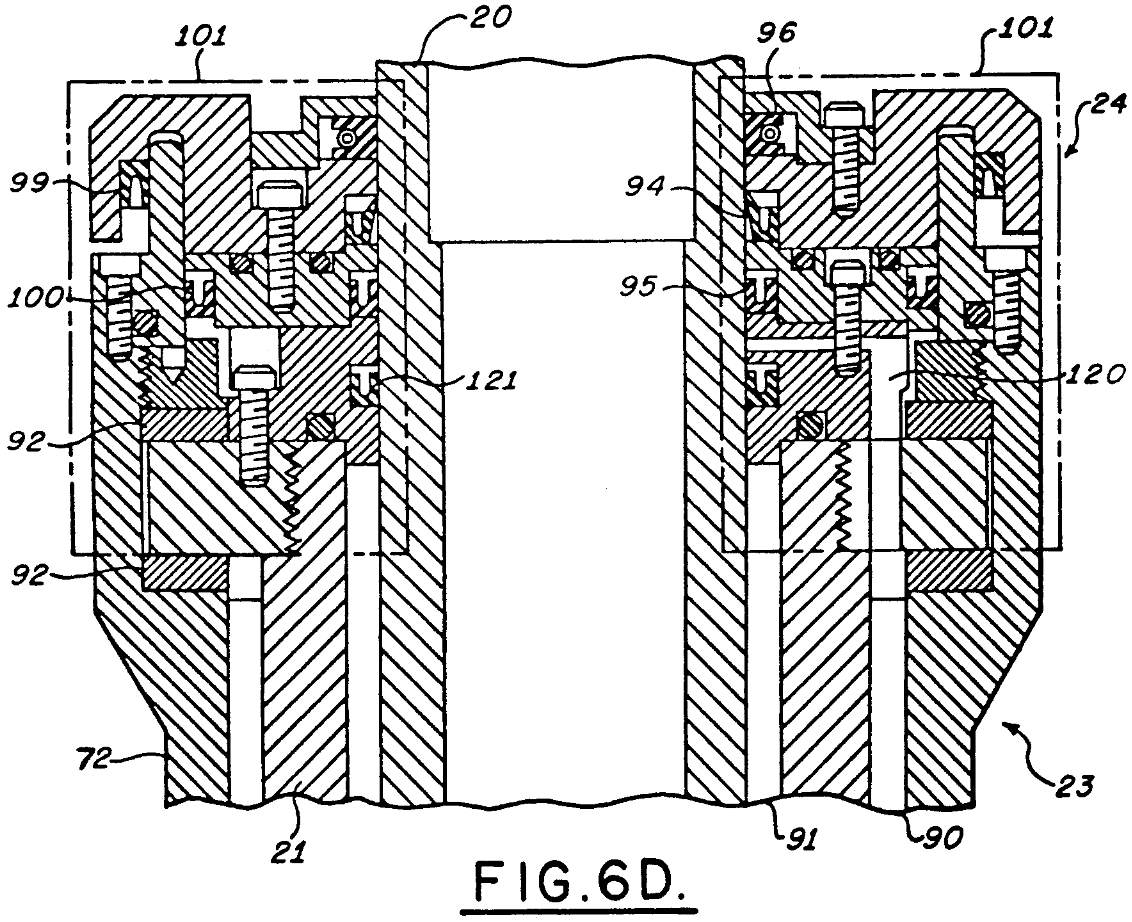

Referring to FIG. 6D, in which like reference numerals indicate like elements with respect to FIG. 6, further details of the primary seal and upper bearing assemblies are illustrated. The functions of the seal cartridge assembly 101 are to prevent seawater leakage between the mast 20 and the rotary tube 21; prevent seawater leakage between the rotary tube 21 and the outer housing 22; remove ice, salt encrustation or other debris from the mast 20 to prevent seal damage; and, to prevent any seepage past the seals from entering the annulus between the mast 20 and the rotary tube 21. To accomplish this, the linear and rotary motions of the mast assembly are separated at the seal cartridge 101. The seal cartridge assembly 101 is mounted to, and rotates with, the rotary tube 21 and mast 20. One set of seals, comprising the primary seal 94 and the backup seal 95, is installed between the mast 20 and rotary tube 21 and is subjected only to linear motion between the mast and rotary tube. A second set of seals 99, 100 is installed between the rotary tube and stationary outer housing 22 and is subjected only to rotary motion. In the embodiment illustrated, the seals are of the spring-energized U-cup design constructed of Teflon filled polymer, as illustrated in FIG. 6B. The spring-loaded segmented scraper ring 96 is mounted above the primary linear seal 94 to remove ice and other debris from the mast as it is retracted.

To prevent minor seepage past the linear seals from entering the annulus between the mast and rotary tube, a leak-off path 120 is established below the backup linear seal 95 directing water into the annulus between the rotary and outer tubes. A lightly loaded rubber seal 121 below the leak-off holes 120 functions as a dam, ensuring that the leakage follows the proper path. The seal cartridge 101 facilitates seal replacement without having to remove the mast assembly from the submarine.

Figures 7A, 7B:
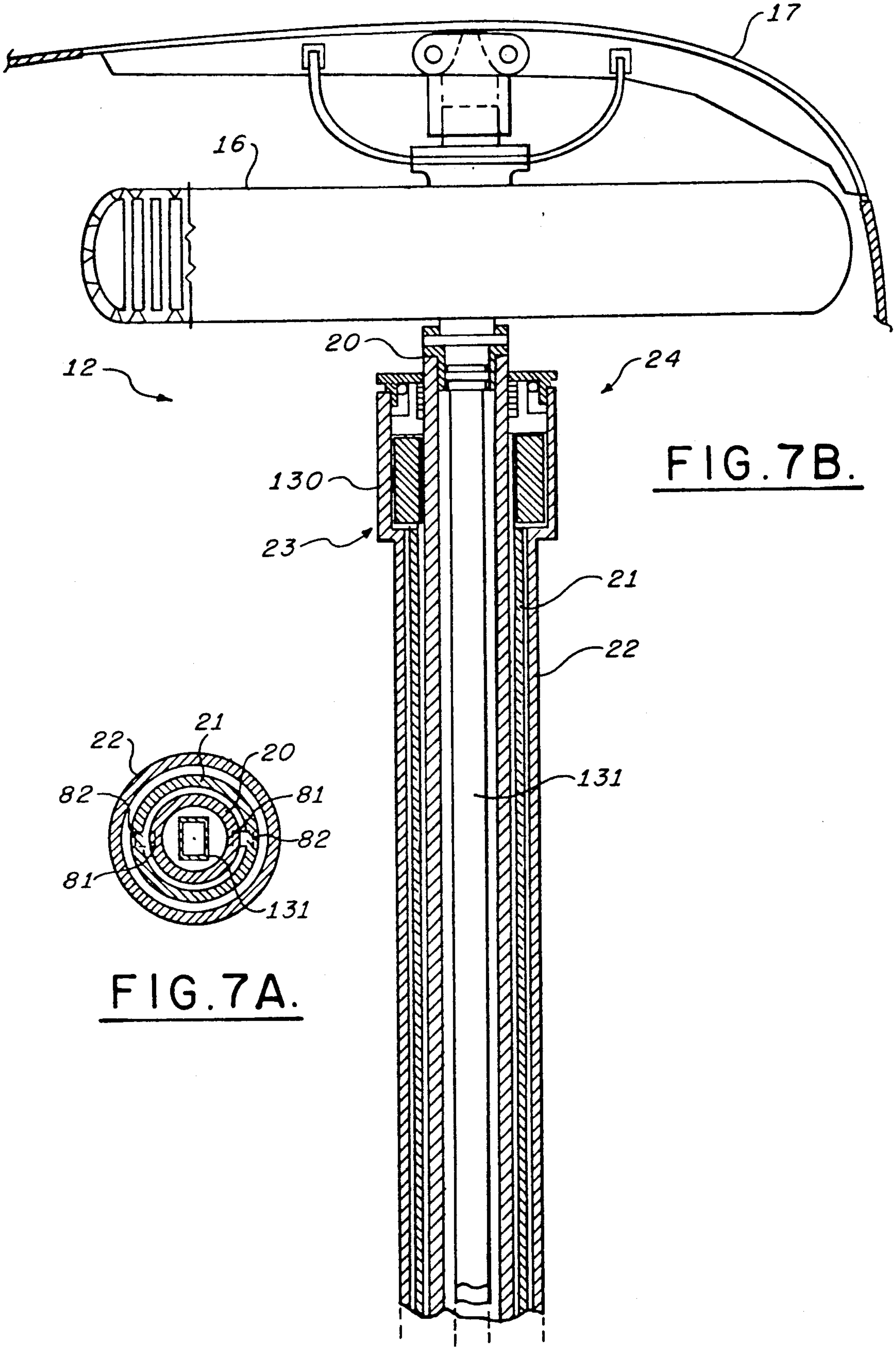
FIGS. 7B and 7C represent an elevation view in cross-section of the radar mast system of FIGS. 2A and 2B illustrating further details thereof.
FIG. 7A is a plan view of a cross-section of FIG. 7C.
Figure 7C:
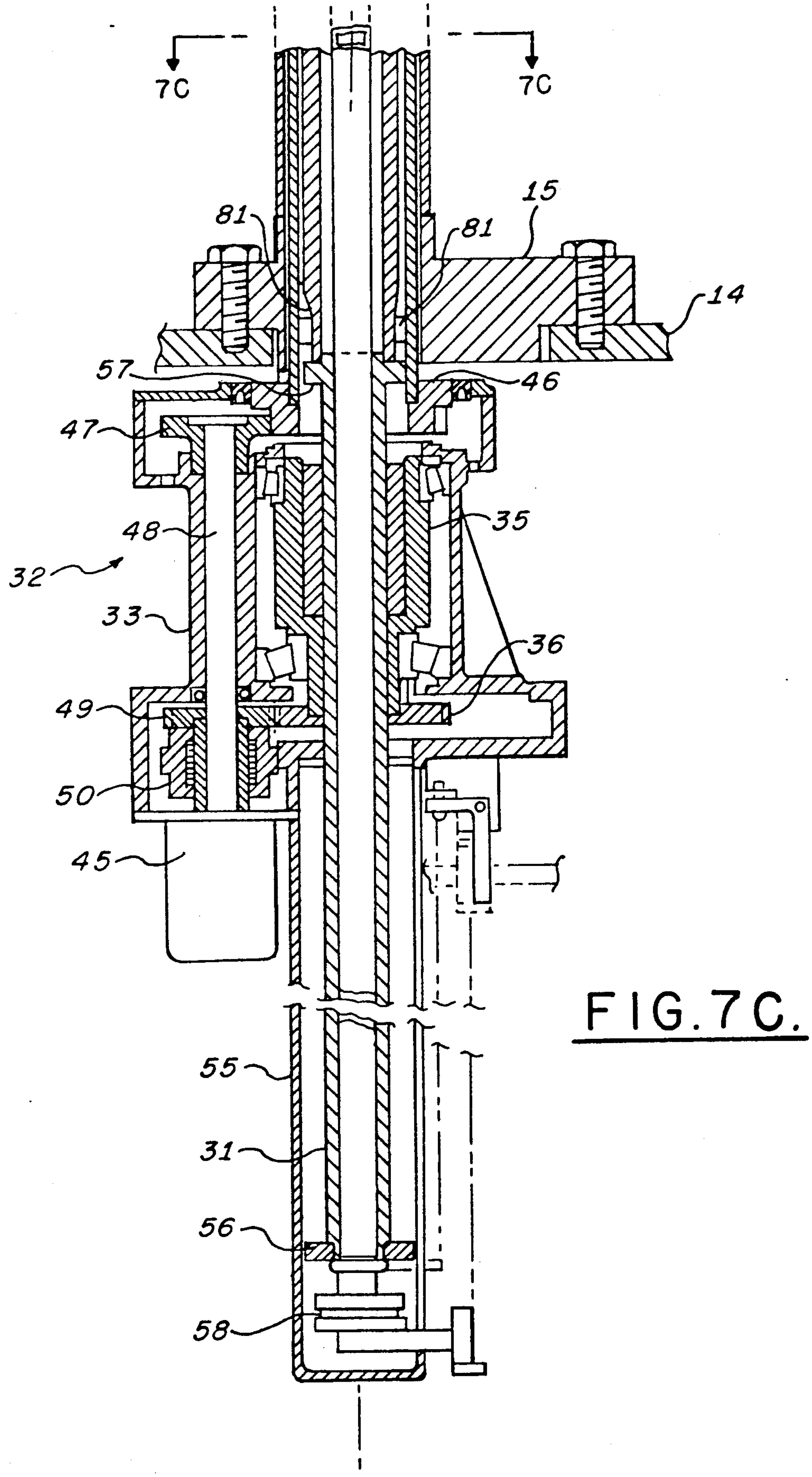

Referring to FIGS. 7A, 7B and 7C, in which like reference numerals indicate like components with respect to the previously described figures, a cross-sectional elevation view of the mast assembly of the present invention is illustrated. FIG. 7A shows the cross-section through the assembly at line 7C—7C of FIG. 7C. The mast keys 81 and keyways 82 that prevent rotation between the mast 20 and the rotary tube 21, but permit translation therebetween, are shown in FIG. 7A. The mounting location for the split collar 25 of the upper support 13 (FIGS. 2A-B) is illustrated at 130. A waveguide 131 couples the rotary joint 58 to the antenna 16.

Figure 8:
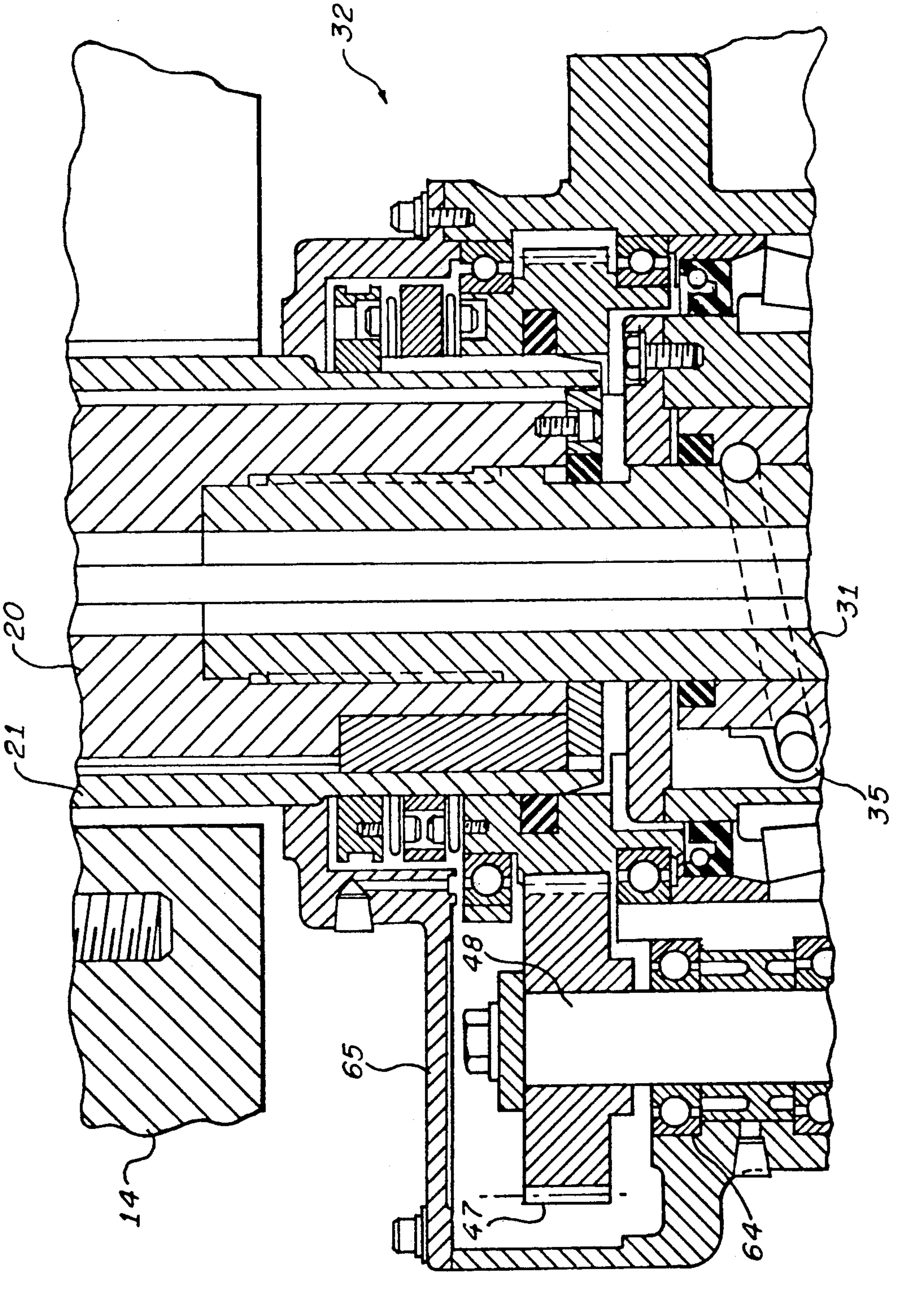
FIG. 8 is an elevation view in cross-section illustrating details of the rotary tube lower support of FIG. 3.

Referring to FIG. 8, in which like reference numerals indicate like components with respect to the previous figures, details of the support 84 (FIG. 3) of the lower end of the rotary tube 21 in the transmission 32 are illustrated. FIG. 8 depicts the detailed construction of this support.

It is appreciated from the foregoing, that the present invention provides a rotational and translational multifunction drive system utilizing a single drive motor for all functions. Although a hydraulic motor is utilized in the preferred embodiment, other types of motors, such as electric, may also be utilized in practicing the invention. Positive alignment is built into the radar mast system and eliminated from installation requirements. The simplified design of the present invention provides ease of installation and reduces hull penetrations with minimum modifications to the submarine, utilizing the existing hydraulic, electrical, and waveguide hull penetrations. A single hull penetration with no dynamic seals within the existing hull fitting is utilized. The present invention provides a high degree of reliability in a configuration that is simple, rigid, and requires minimum system installation costs. The present invention reduces loading on the extension mechanism, reduces space requirements and complexity of the drive unit, reduces hydraulic cylinder nose and multiple gear pass noise, and provides positive control and locking of mast operations.

While the invention has been described in its preferred embodiment, it is to be understood that the words which have been used are the words of description rather than limitation and that changes may be made within the purview of the appended claims without departing from the true scope and spirit of the invention in its broader aspects.

I claim:

1. Apparatus for selectively imparting translational or rotational motion to a mast using a single drive motor comprising a drive screw coaxially attached to said mast, a drive nut threaded on said drive screw, coupling means for coupling said drive motor to said drive nut for imparting rotary motion thereto, rotary tube means concentrically disposed around said mast, said mast being keyed to said rotary tube means to prevent relative rotation therebetween and to permit relative axial translation therebetween, and locking means coupled to said rotary tube means for selectively preventing and permitting rotation of said rotary tube means, thereby selectively preventing and permitting rotation of said drive screw, so that said rotary motion of said drive nut selectively impart said translational or rotational motion to said mast, respectively.

2. The apparatus of claim 1 wherein said drive screw and drive nut comprise a ball bearing drive screw and drive nut mechanism.

3. The apparatus of claim 1 wherein said locking means comprises a shaft rotationally geared to said rotary tube means, and brake means coupled to said shaft for selectively preventing and permitting rotation thereof, thereby selectively preventing and permitting rotation of said rotary tube means.

4. The apparatus of claim 3 wherein said brake means comprises a brake/indexing mechanism for preventing rotation of said shaft by locking said shaft at a predetermined angular position thereof.

5. The apparatus of claim 3 wherein said coupling means comprises a drive nut gear attached to said drive nut and geared to said drive motor for imparting said rotary motion to said drive nut.

6. The apparatus of claim 5 further including an auxiliary gear mounted for rotation on said shaft and meshed with said drive nut gear, and a clutch coupled between said auxiliary gear and said shaft for selectively locking said auxiliary gear to said shaft for rotation therewith or releasing said auxiliary gear for rotation with respect to said shaft.

7. The apparatus of claim 5 further including an auxiliary gear mounted for rotation on said shaft and meshed with said drive nut gear, and a clutch coupled between said auxiliary gear and said shaft for selectively locking said auxiliary gear to said shaft to rotation therewith or releasing said auxiliary gear for rotation with respect to said shaft, said apparatus being operative to apply said brake means and release said clutch when imparting translational motion to said mast and operative to release said brake means and apply said clutch when imparting rotational motion to said mast.

8. The apparatus of claim 7 wherein gear ratios are such of said coupling means, auxiliary gear and gearing between said shaft and rotary tube means so that said drive nut and rotary tube means rotate at the same angular rate with respect to each other when imparting rotational motion to said mast.

9. The apparatus of claim 1 including a stop pad disposed at an end of said drive screw for abutting said drive nut when imparting translational motion to said mast, so as to limit said translational motion.

10. The apparatus of claim 1 wherein said drive motor comprises a bi-directional drive motor so as to impart bi-directional translational motion to said mast.

11. The apparatus of claim 1 wherein said drive motor comprises a multiple-speed drive motor so as to impart multiple-speed translational and multiple-speed rotational motions to said mast.

12. The apparatus of claim 1 wherein said drive motor comprises a hydraulic motor.

13. The apparatus of claim 1 further including outer tube means concentrically disposed around said rotary tube means, said rotary tube means being mounted in said outer tube means only for rotational motion with respect thereto.

14. The apparatus of claim 13 wherein said apparatus is mounted on a submarine having a hull defining a subsafe space, said outer tube means has a lower end fitted to said hull with a water tight hull fitting, said rotary tube means extending into said subsafe space with said drive motor, drive nut, coupling means and locking means being disposed within said subsafe space, and said drive motor comprises a bi-directional drive motor for imparting bi-directional translational motion to said mast so as to selectively extend said mast from said submarine and retract said mast into said submarine, said apparatus being effective to impart said rotational motion to said mast when said mast is in a fully extended position.

15. The apparatus of claim 14 wherein said drive motor comprises a multi-speed motor effective to extend said mast from said submarine at a high speed and decelerate extension thereof to said fully extended position.

16. The apparatus of claim 14 wherein said locking means comprises a brake/indexing assembly for locking said rotary tube means at a predetermined angular position so as to index said mast for retraction into said submarine.

17. The apparatus of claim 14 wherein said outer tube means includes an upper end, said apparatus further including a seal assembly disposed at said upper end of said outer tube means comprising translational seal means disposed around said mast for sealing against translational motion of said mast, said translational seal means being coupled for rotation with said rotary tube means, and rotary seal means disposed between said translational seal means and said outer tube means for sealing against rotation of said translational seal means, said translational and rotational seal means comprising a cartridge removable from said upper end of said outer tube means.

18. The apparatus of claim 14 wherein said hull fitting includes a water tight static seal between said outer tube means and said hull.

19. The apparatus of claim 14 wherein said mast comprises a radar antenna mast.

* * * * *